(12) United States Patent
Jia et al.

(10) Patent No.: US 12,349,198 B2
(45) Date of Patent: Jul. 1, 2025

(54) METHOD AND APPARATUS FOR TRANSMITTING A SYSTEM INFORMATION REQUEST AND SYSTEM

(71) Applicant: FUJITSU LIMITED, Kawasaki (JP)

(72) Inventors: Meiyi Jia, Beijing (CN); Guorong Li, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 674 days.

(21) Appl. No.: 17/476,567

(22) Filed: Sep. 16, 2021

(65) Prior Publication Data

US 2022/0007425 A1 Jan. 6, 2022

Related U.S. Application Data

(63) Continuation of application No. PCT/CN2019/080156, filed on Mar. 28, 2019.

(51) Int. Cl.
*H04W 72/00* (2023.01)
*H04L 5/00* (2006.01)
*H04W 72/21* (2023.01)
*H04W 74/0833* (2024.01)

(52) U.S. Cl.
CPC ....... *H04W 74/0833* (2013.01); *H04L 5/0053* (2013.01); *H04W 72/21* (2023.01)

(58) Field of Classification Search
None
See application file for complete search history.

(56) References Cited

U.S. PATENT DOCUMENTS

| | | |
|---|---|---|
| 2017/0223732 A1 | 8/2017 | Bertrand et al. |
| 2018/0310344 A1 | 10/2018 | Zhou et al. |
| 2019/0053080 A1 | 2/2019 | Ryu et al. |
| 2019/0053129 A1 | 2/2019 | Kim et al. |
| 2019/0373452 A1 | 12/2019 | Huang et al. |
| 2020/0068489 A1 | 2/2020 | Li et al. |
| 2020/0120708 A1 | 4/2020 | Liu et al. |
| 2020/0170020 A1 | 5/2020 | Agiwal et al. |
| 2020/0245330 A1 | 7/2020 | Jiang |
| 2020/0275494 A1* | 8/2020 | Ingale .................. H04L 5/0091 |
| 2020/0396654 A1* | 12/2020 | Freda .................... H04W 36/06 |
| 2022/0086841 A1* | 3/2022 | Agiwal ............. H04W 74/0833 |

FOREIGN PATENT DOCUMENTS

| | | |
|---|---|---|
| CN | 107708205 A | 2/2018 |
| CN | 107980234 A | 5/2018 |
| CN | 108353408 A | 7/2018 |
| CN | 108521890 A | 9/2018 |

(Continued)

OTHER PUBLICATIONS

ETSI TS 138 321 V15.3.0 (Sep. 2018).*

(Continued)

*Primary Examiner* — Abdelillah Elmejjarmi
(74) *Attorney, Agent, or Firm* — Myers Wolin, LLC

(57) ABSTRACT

A method and apparatus for transmitting a system information request and a system. The method includes: a terminal equipment determines to use a system information (SI) request procedure based on message 1 or an SI request procedure based on message 3 to request a network device for on demand system information on SUL or NUL according to whether a serving cell is configured with the SUL.

16 Claims, 8 Drawing Sheets

(56) References Cited

FOREIGN PATENT DOCUMENTS

| CN | 108810827 A | 11/2018 |
|---|---|---|
| CN | 109152036 A | 1/2019 |
| CN | 113170380 A | 7/2021 |
| EP | 3 871 447 | 6/2020 |
| WO | 2020/111764 A1 | 6/2020 |

OTHER PUBLICATIONS

Notice of Reasons for Refusal issued by the Japan Patent Office for corresponding Japanese Patent Application No. 2021-556930, mailed on Nov. 15, 2022, with an English translation.

International Search Report of the International Searching Authority issued by the China National Intellectual Property Administration for International Patent Application No. PCT/CN2019/080156, mailed on Jan. 6, 2020, with an English translation.

First Notification of Office Action and Search Report issued by the China National Intellectual Property Administration for corresponding Chinese Patent Application No. 201980093727.X, dated Jun. 1, 2023, with an English translation.

Second Notification of Office Action and Search Report issued by the China National Intellectual Property Administration for corresponding Chinese Patent Application No. 201980093727.X, mailed on Nov. 18, 2023, with an English translation.

Ericsson, "Clarification for random access on SUL", Change Request 38.331 CR 0987 rev-current version: 15.4.0, 3GPP TSG-RAN2 Meeting #105, R2-1902746, Athens, Greece, Feb. 25-Mar. 1, 2019.

Extended European Search Report with the Supplementary Search Report and the European Search Opinion issued by the European Patent Office for corresponding European Patent Application No. 19922168.0, mailed on Mar. 7, 2022.

3GPP TS 38.331 V 15.5.0, "3rd Generation Partnership Project; Technical Specification Group Radio Access Network; NR; Radio Resource Control (RRC) protocol specification (Release 15)", Mar. 2019.

Samsung Electronics, "SI Request Configuration for SUL", 3GPP TSG-RAN2 Adhoc, R2-1809475, vol. RAN WG2, Montreal, Canada, Jul. 2-6, 2018.

3GPP TS 38.321 V 15.4.0 "3rd Generation Partnership Project; Technical Specification Group Radio Access Network; NR; Medium Access Control (MAC) protocol specification (Release 15)", Dec. 2018.

Decision of Rejection with Search Report issued by the China National Intellectual Property Administration for corresponding Chinese Patent Application No. 201980093727.X, mailed on Mar. 22, 2024, with an English translation.

Huawei et al., "Clarification on UL_SUL indicator field and SRS request field", Work item code: NR_newRAT-Core, 3GPP TSG-RAN WG1 Meeting #96, [Draft] Change Request, R1-1903708, Athens, Greece, Feb. 25-Mar. 1, 2019.

Communication pursuant to Article 94(3) EPC issued by the European Patent Office for corresponding European Patent Application No. 19 922 168.0, mailed on Feb. 13, 2025.

* cited by examiner

301 a terminal equipment determines to use an SI request procedure based on message 1 or an SI request procedure based on message 3 to request a network device for on demand system information via an SUL or an NUL according to whether a serving cell is configured with the SUL

FIG. 3

1> if ~~SIB1 includes si-SchedulingInfo containing si-RequestConfigSUL~~ the serving cell is configured with supplementary uplink and criteria to select supplementary uplink as defined in TS 38.321[13], clause 5.1.1 is met:

2> trigger the lower layer to initiate the Random Access procedure on supplementary uplink in accordance with [3] using the PRACH preamble(s) and PRACH resource(s) in *si-RequestConfigSUL* corresponding to the SI message(s) that the UE requires to operate within the cell, and for which *si-BroadcastStatus* is set to *notBroadcasting*;

2> if acknowledgement for SI request is received from lower layers:

3> acquire the requested SI message(s) as defined in sub-clause 5.2.2.3.2, immediately;

1> else if ~~SIB1 includes si-SchedulingInfo containing si-RequestConfig~~ the serving cell is configured with normal uplink and criteria to select normal uplink as defined in TS 38.321[13], clause 5.1.1 is met:

2> trigger the lower layer to initiate the Random Access procedure on normal uplink in accordance with [3] using the PRACH preamble(s) and PRACH resource(s) in *si-RequestConfig* corresponding to the SI message(s) that the UE requires to operate within the cell, and for which *si-BroadcastStatus* is set to *notBroadcasting*;

2> if acknowledgement for SI request is received from lower layers:

3> acquire the requested SI message(s) as defined in sub-clause 5.2.2.3.2, immediately;

FIG. 4

3> apply the configuration included in the *servingCellConfigCommon*;

3> apply the specified PCCH configuration defined in 9.1.1.3;

3> if the UE has a stored valid version of a SIB, in accordance with sub-clause 5.2.2.2.1, that the UE requires to operate within the cell in accordance with sub-clause 5.2.2.1;

4> use the stored version of the required SIB;

3> if the UE has not stored a valid version of a SIB, in accordance with sub-clause 5.2.2.2.1, of one or several required SIB(s), in accordance with sub-clause 5.2.2.1;

4> for the SI message(s) that, according to the *si-SchedulingInfo*, contain at least one required SIB and for which *si-BroadcastStatus* is set to broadcasting;

5> acquire the SI message(s) as defined in sub-clause 5.2.2.3.2;

4> for the SI message(s) that, according to the *si-SchedulingInfo*, contain at least one required SIB and for which *si-BroadcastStatus* is set to *notBroadcasting*;

5> if the UE supports one or more of frequency bands indicated in the *frequencyBandList* of supplementary uplink band;

6> consider supplementary uplink as configured in the serving cell;

6> trigger a request to acquire the SI message(s) over supplementary uplink as defined in sub-clause 5.2.2.3.3;

FIG. 5

4> for the SI message(s) that, according to the *si-SchedulingInfo*, contain at least one required SIB and for which *si-BroadcastStatus* is set to *notBroadcasting*;

5> if the UE supports one or more of frequency bands indicated in the *frequencyBandList* of supplementary uplink band;

6> consider supplementary uplink as configured in the serving cell;

6> trigger a request to acquire the SI message(s) over supplementary uplink as defined in sub-clause 5.2.2.3.3;

FIG. 6

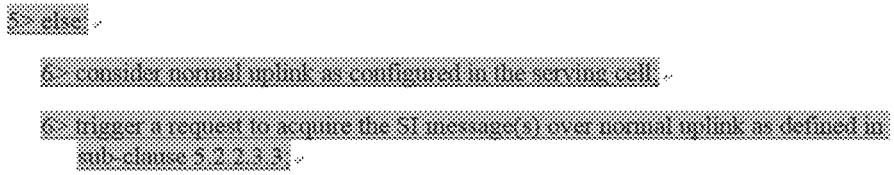

a terminal equipment determines to use the SI request procedure based on message 1 or the SI request procedure based on message 3 to request on demand system information from the network device via SUL or NUL according to whether SIB1 includes configuration of the SUL and whether the terminal equipment is able to support the configuration of the SUL

FIG. 7

1> if *SIB1* includes *si-SchedulingInfo* containing *si-RequestConfigSUL* and if the UE supports one or more of the frequency bands indicated in the *frequencyBandList* of supplementary uplink and criteria to select supplementary uplink as defined in TS 38.321[13], clause 5.1.1 is met:

2> trigger the lower layer to initiate the Random Access procedure on supplementary uplink in accordance with [3] using the PRACH preamble(s) and PRACH resource(s) in *si-RequestConfigSUL* corresponding to the SI message(s) that the UE requires to operate within the cell, and for which *si-BroadcastStatus* is set to *notBroadcasting*.

2> if acknowledgement for SI request is received from lower layers:

3> acquire the requested SI message(s) as defined in sub-clause 5.2.2.3.2, immediately;

1> else if *SIB1* includes *si-SchedulingInfo* containing *si-RequestConfig* and criteria to select normal uplink as defined in TS 38.321[13], clause 5.1.1 is met:

2> trigger the lower layer to initiate the Random Access procedure on normal uplink in accordance with [3] using the PRACH preamble(s) and PRACH resource(s) in *si-RequestConfig* corresponding to the SI message(s) that the UE requires to operate within the cell, and for which *si-BroadcastStatus* is set to *notBroadcasting*.

2> if acknowledgement for SI request is received from lower layers:

3> acquire the requested SI message(s) as defined in sub-clause 5.2.2.3.2, immediately;

901 a terminal equipment determines to use the SI request procedure based on message 1 or the SI request procedure based on message 3 according to whether the terminal equipment is able to support the configuration of SUL and the configuration of NUL to request on demand system information from the network device via SUL or NUL

FIG. 9

3> apply the configuration included in the *servingCellConfigCommon*;

3> apply the specified PCCH configuration defined in 9.1.1.3;

3> if the UE has a stored valid version of a SIB, in accordance with sub-clause 5.2.2.2.1, that the UE requires to operate within the cell in accordance with sub-clause 5.2.2.1:

4> use the stored version of the required SIB;

3> if the UE has not stored a valid version of a SIB, in accordance with sub-clause 5.2.2.2.1, of one or several required SIB(s), in accordance with sub-clause 5.2.2.1:

4> for the SI message(s) that, according to the *si-SchedulingInfo*, contain at least one required SIB and for which *si-BroadcastStatus* is set to broadcasting:

5> acquire the SI message(s) as defined in sub-clause 5.2.2.3.2;

4> for the SI message(s) that, according to the *si-SchedulingInfo*, contain at least one required SIB and for which *si-BroadcastStatus* is set to *notBroadcasting*:

5> <u>if the UE supports one or more of frequency bands indicated in the *frequencyBandList* of supplementary uplink band:</u>

6> trigger a request to acquire the SI message(s) <u>over supplementary uplink</u> as defined in sub-clause 5.2.2.3.3;

FIG. 10

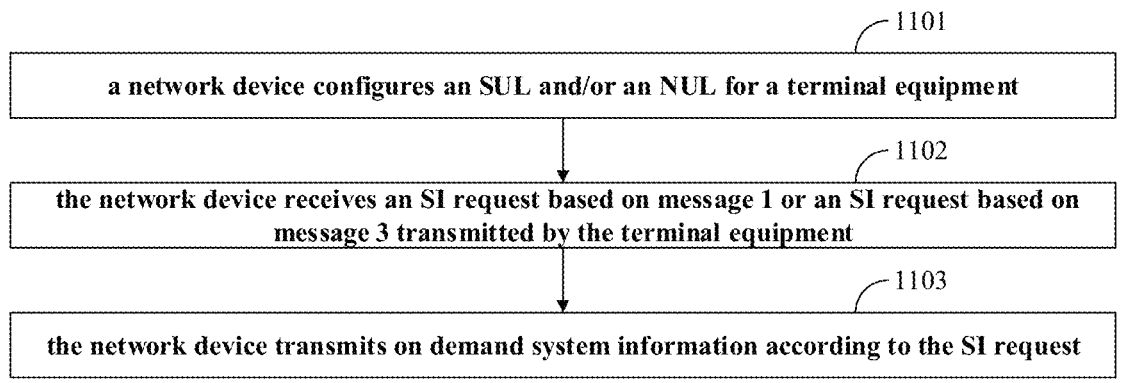

FIG. 11

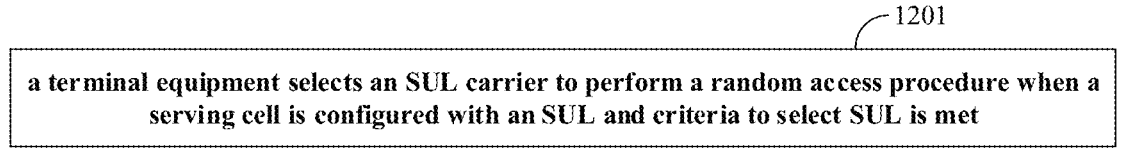

FIG. 12

METHOD AND APPARATUS FOR TRANSMITTING A SYSTEM INFORMATION REQUEST AND SYSTEM

CROSS-REFERENCE TO RELATED APPLICATION

This application is a continuation application of International Application PCT/CN2019/080156 filed on Mar. 28, 2019 and designated the U.S., the entire contents of which are incorporated herein by reference.

FIELD

This disclosure relates to the field of communications, and in particular to a method and apparatus for transmitting a system information request and a system.

BACKGROUND

In New Radio (NR), in order to improve uplink coverage of high-frequency scenarios, supplementary uplink (SUL) may be configured as assistance of normal uplink (NUL) or non-supplementary uplink (NUL). FIG. 1 is a schematic diagram of an example of using supplementary uplink. As shown in FIG. 1, in this example, a network device configures a terminal equipment with one downlink and two uplinks of the same cell by using SUL. Under normal circumstances, a network device may provide any one of the following configurations that:
SIB1 only includes si-RequestConfigSUL;
SIB1 only includes si-RequestConfig;
SIB1 includes si-RequestConfigSUL and si-RequestConfig; and
SIB1 does not include si-RequestConfigSUL and si-RequestConfig.

In the above example, SIB is an abbreviation of system information block, and SIB1 is a type of an existing system information block.

On the other hand, for a terminal equipment in an idle state or an inactive state, on demand system information may be acquired by executing a system information (SI) request. Currently, there are two methods for executing SI requests, namely, an SI request procedure based on message 1 and an SI request procedure based on message 3. Generally, whether to execute the SI request procedure based on message 1 or the SI request procedure based on message 3 may be determined according to the following principles:
in a case where SIB1 includes both si-RequestConfigSUL and si-RequestConfig, a selected uplink carrier is not considered, that is, regardless of whether the selected uplink carrier is SUL (supplementary uplink) or NUL (normal uplink, non-supplementary uplink), the SI request procedure based on message 1 is used;
if the selected uplink carrier is SUL and SIB1 only includes si-RequestConfigSUL, the SI request procedure based on message 1 is used; otherwise, the SI request procedure based on message 3 is used;
if the selected uplink carrier is NUL and SIB1 only includes si-RequestConfig, the SI request procedure based on message 1 is used; otherwise, the SI request procedure based on message 3 is used;
in a case where SIB1 includes neither si-RequestConfigSUL nor si-RequestConfig, a selected uplink carrier is not considered, that is, regardless of whether the selected uplink carrier is SUL (supplementary uplink) or NUL (normal uplink, non-supplementary uplink), the SI request procedure based on message 3 is used.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

It was found by the inventors that based on the current mechanism, as long as SIB1 contains a relevant configuration, such as si-RequestConfigSUL or si-RequestConfig, the configuration is available for the terminal equipment. However, when a capability of the terminal equipment is taken into account, even if the relevant configuration is included in SIB1, the configuration may not be available for the terminal equipment. In this case, if the principle of the current SI request procedure is still adopted, the terminal equipment may not be able to initiate an SI request procedure. For example, SIB1 contains a configuration of SUL, but the capability of the terminal equipment cannot support the use of this SUL, according to the current principle, the terminal equipment has possibility to determine to initiate the SI request procedure based on message 1 using SUL (that is, on the SUL); however, the terminal equipment cannot carry out such a method, thereby resulting in that the terminal equipment cannot obtain on demand system information.

In order to solve at least one of the above problems or other similar problems, embodiments of this disclosure provide a method and apparatus for transmitting a system information request and a system.

According to a first aspect of the embodiments of this disclosure, there is provided a method for transmitting a system information request, applicable to a terminal equipment, the method including:
determining by a terminal equipment to use a system information (SI) request procedure based on message 1 or an SI request procedure based on message 3 to request a network device for on demand system information on SUL or NUL according to whether a serving cell is configured with SUL.

According to a second aspect of the embodiments of this disclosure, there is provided a method for configuring a system information request, applicable to a network device, the method including:
configuring an SUL and/or an NUL by a network device for a terminal equipment;
receiving, by the network device, an SI request based on message 1 or an SI request based on message 3 transmitted by the terminal equipment; and
transmitting on demand system information by the network device according to the SI request.

According to a third aspect of the embodiments of this disclosure, there is provided an apparatus for transmitting a system information request, configured in a terminal equipment, the apparatus including:
a determining unit configured to determine to use a system information (SI) request procedure based on message 1 or an SI request procedure based on message 3 to request a network device for on demand system information on SUL or NUL according to whether a serving cell is configured with SUL.

According to a fourth aspect of the embodiments of this disclosure, there is provided an apparatus for configuring a system information request, configured in a network device, the apparatus including:

a configuring unit configured to configure an SUL and/or an NUL for a terminal equipment;

a receiving unit configured to receive an SI request based on message 1 or an SI request based on message 3 transmitted by the terminal equipment; and a transmitting unit configured to transmit on demand system information according to the SI request.

According to a fifth aspect of the embodiments of this disclosure, there is provided a carrier selection method, applicable to a terminal equipment, the method including:

selecting an SUL carrier by a terminal equipment to perform a random access procedure when a serving cell is configured with an SUL and criteria to select SUL is met; wherein, the criteria to select SUL being met is that, if a carrier to use for a random access procedure is not explicitly signalled, and if a serving cell for the random access procedure is configured with SUL or the SUL is configured via dedicated signaling, and if RSRP of a downlink pathloss reference is less than a threshold, the SUL carrier is selected for the random access procedure; or if a carrier to use for a random access procedure is not explicitly signalled, and if a serving cell for the random access procedure is configured with SUL or dedicated signaling includes configuration information of random access parameters on the SUL, and if RSRP of a downlink pathloss reference is less than a threshold, the SUL carrier is selected for the random access procedure; or if a carrier to use for a random access procedure is not explicitly signalled, and if a serving cell for the random access procedure is configured with SUL, and if RSRP of a downlink pathloss reference is less than a threshold, the SUL carrier is selected for the random access procedure.

According to a sixth aspect of the embodiments of this disclosure, there is provided a carrier selection apparatus, configured in a terminal equipment, the apparatus including:

a selecting unit configured to select an SUL carrier to perform a random access procedure when a serving cell is configured with an SUL and criteria to select SUL is met; wherein, the criteria to select SUL being met is that, if a carrier to use for a random access procedure is not explicitly signalled, and if a serving cell for the random access procedure is configured with SUL or the SUL is configured via dedicated signaling, and if RSRP of a downlink pathloss reference is less than a threshold, the SUL carrier is selected for the random access procedure; or if a carrier to use for a random access procedure is not explicitly signalled, and if a serving cell for the random access procedure is configured with SUL or dedicated signaling includes configuration information of random access parameters on the SUL, and if RSRP of a downlink pathloss reference is less than a threshold, the SUL carrier is selected for the random access procedure; or if a carrier to use in a random access procedure is not explicitly signalled, and if a serving cell for the random access procedure is configured with SUL, and if RSRP of a downlink pathloss reference is less than a threshold, the SUL carrier is selected for the random access procedure.

According to a seventh aspect of the embodiments of this disclosure, there is provided a terminal equipment, including the apparatuses as described in the third aspect or the sixth aspect.

According to an eighth aspect of the embodiments of this disclosure, there is provided a network device, including the apparatus as described in the fourth aspect.

According to a ninth aspect of the embodiments of this disclosure, there is provided a communication system, including the terminal equipment as described in the seventh aspect and the network device as described in the eighth aspect.

According to another aspect of the embodiments of this disclosure, there is provided a computer readable program, which, when executed in a terminal equipment, will cause a computer to carry out the methods described in the first aspect or the fifth aspect in the terminal equipment.

According to a further aspect of the embodiments of this disclosure, there is provided a storage medium storing a computer readable program, which will cause a computer to carry out the methods described in the first aspect or the fifth aspects in the terminal equipment.

According to yet another aspect of the embodiments of this disclosure, there is provided a computer readable program, which, when executed in a network device, will cause a computer to carry out the method described in the second aspect in the network device.

According to still another aspect of the embodiments of this disclosure, there is provided a storage medium storing a computer readable program, which will cause a computer to carry out the method described in the second aspect in a network device.

An advantage of the embodiments of this disclosure exists in that according to at least one aspect of the embodiments of this disclosure, the terminal equipment determines whether to use the SI request procedure based on message 1 or the SI request procedure based on message 3 on the SUL or NUL according to "whether the terminal equipment is configured with SUL and/or whether the terminal equipment support the SUL configuration", which can avoid selecting a wrong SI request procedure in a case where a capability of the terminal equipment does not support the SUL configuration. In addition, the condition of "whether the terminal equipment is configured with SUL and/or whether the terminal equipment can support the configuration of SUL or not" may be integrated into a module, so that only the module needs to be called when judgment is made, which optimizes terminal implementation procedure and saves cost.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 3 is a schematic diagram of the method for transmitting a system information request of Embodiment 1;

FIG. 4 is a schematic diagram of an example of applying the method shown in FIG. 3;

FIG. 5 is a schematic diagram of another example of applying the method shown in FIG. 3;

FIG. 6 is a schematic diagram of a further example of applying the method shown in FIG. 3;

FIG. 7 is another schematic diagram of the method for transmitting a system information request of Embodiment 1;

FIG. 8 is a schematic diagram of an example of applying the method shown in FIG. 7;

FIG. 9 is a further schematic diagram of the method for transmitting a system information request of Embodiment 1;

FIG. 10 is a schematic diagram of an example of applying the method shown in FIG. 9;

FIG. 11 is a schematic diagram of the method for configuring a system information request of Embodiment 2;

FIG. 12 is a schematic diagram of the carrier selection method of Embodiment 3;

DETAILED DESCRIPTION

Figure 1:
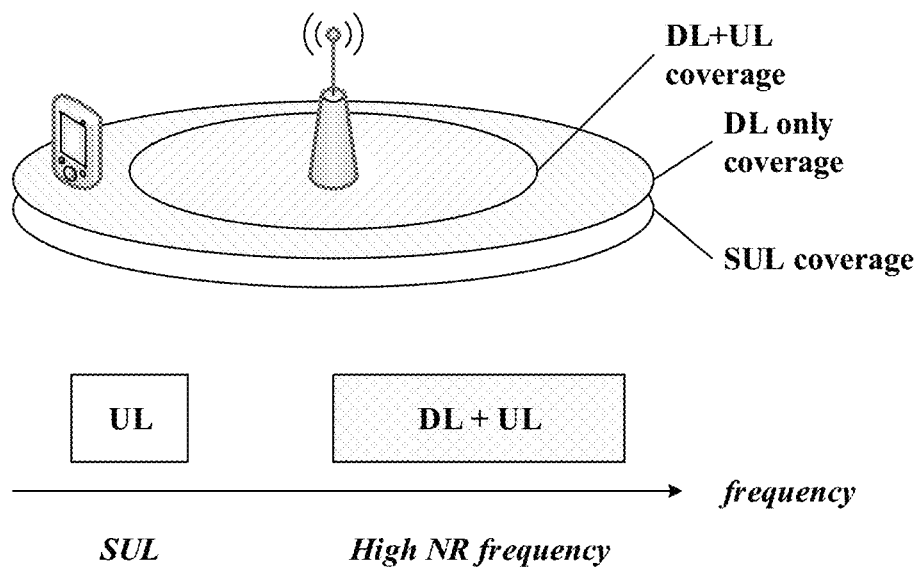
FIG. 1 is schematic diagram of an example of using supplementary uplink.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

Figure 2:
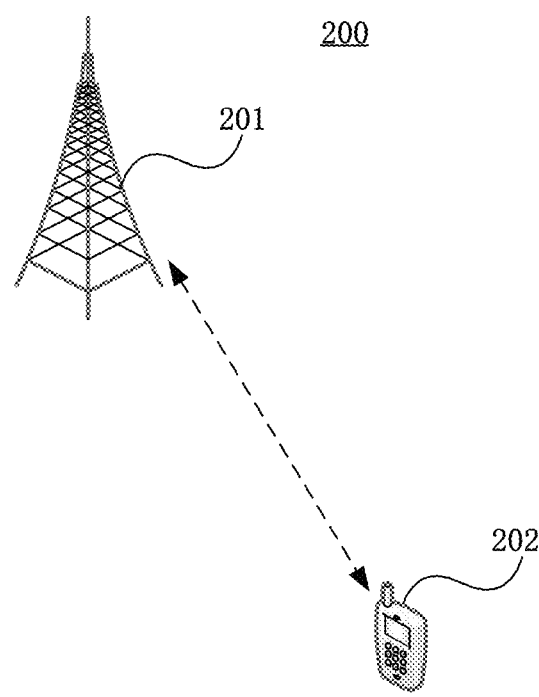
FIG. 2 is a schematic diagram of a communication system of an embodiment of this disclosure.

FIG. 2 is a schematic diagram of a communication system of an embodiment of this disclosure, in which a case where a terminal equipment and a network device are taken as examples is schematically shown. As shown in FIG. 2, the communication system 200 may include a network device 201 and a terminal equipment 202. For the sake of simplicity, an example having only one terminal equipment is schematically given in FIG. 2. And the network device 201 is, for example, a network device gNB in an NR system.

In the embodiment of this disclosure, existing traffics or traffics that may be implemented in the future may be performed between the network device 201 and the terminal equipment 202. For example, such traffics may include but not limited to enhanced mobile broadband (eMBB), massive machine type communication (MTC), and ultra-reliable and low-latency communication (URLLC), etc.

The terminal equipment 202 may transmit data to the network device 201, for example, in a grant-free transmission mode. The network device 201 may receive data transmitted by one or more terminal equipments 202, and feed back information, such as acknowledgement (ACK) information or non-acknowledgement (NACK) information, to the terminal equipment 202, and the terminal equipment 202 may acknowledge terminating a transmission procedure, or may further perform new data transmission, or may perform data retransmission, according to the feedback information.

Embodiment 1

The embodiment of this disclosure provides a method for transmitting a system information request, applicable to a terminal equipment, such as the terminal equipment 202 shown in FIG. 2.

FIG. 3 is a schematic diagram of the method for transmitting a system information request of this embodiment. Referring to FIG. 3, the method includes:

step 301: a terminal equipment determines to use an SI request procedure based on message 1 or an SI request procedure based on message 3 to request a network device for on demand system information via an SUL or an NUL (i.e. on an SUL or on an NUL) according to whether a serving cell is configured with the SUL.

In this embodiment, the terminal equipment may determine to use the SI request procedure based on message 1 or the SI request procedure based on message 3 according to "whether the serving cell is configured with SUL", which may avoid selecting a wrong SI request procedure in a case where a capability of the terminal equipment does not support.

In this embodiment, if the serving cell is configured with SUL and criteria to select SUL is met, the terminal equipment uses the SI request procedure based on message 1 on the SUL to request the on demand system information from the network device; otherwise, if the serving cell is configured with NUL and criteria to select NUL is met, the terminal equipment uses the SI request procedure based on message 1 on the NUL to request the on demand system information from the network device; otherwise, the terminal equipment uses the SI request procedure based on message 3 to request the on demand system information from the network device.

In this embodiment, it is considered that the SUL is configured in the serving cell when one or more of the following conditions are met, these conditions include but not limited to that:
  SIB1 includes si-SchedulingInfo containing si-RequestConfigSUL;
  the terminal equipment supports one or more of frequency bands indicated in a frequencyBandList field for SUL;
  the terminal equipment supports a bandwidth of an initial uplink BWP indicated in a locationAndBandwidth field for SUL; and
  the terminal equipment supports one or more additionalSpectrumEmissions in an NR-NS-PmaxList of a supported SUL band, or, the terminal equipment supports that an additionalSpectrumEmission in a supported SUL band is 0.

In this embodiment, it is considered that the NUL is configured in the serving cell when one or more of the following conditions are met, these conditions include but not limited to that:
  SIB1 includes si-SchedulingInfo containing si-RequestConfig;
  the terminal equipment supports one or more of frequency bands indicated in a frequencyBandList field for NUL;
  the terminal equipment supports a bandwidth of an initial uplink BWP indicated in a locationAndBandwidth field for NUL; and
  the terminal equipment supports one or more additionalSpectrumEmissions in an NR-NS-PmaxList of a supported NUL band, or, the terminal equipment supports that an additionalSpectrumEmission in a supported NUL band is 0.

In this embodiment, as to meet the criteria to select SUL:
  in one implementation, if a carrier to use for a random access procedure is not explicitly signalled, and if a serving cell for the random access procedure is configured with SUL or the SUL is configured via dedicated signaling, and if RSRP of a downlink pathloss reference is less than a threshold, it is considered that the criteria to select SUL is met;
  in another implementation, if a carrier to use for a random access procedure is not explicitly signalled, and if a serving cell for the random access procedure is configured with SUL or dedicated signaling includes configuration information of random access parameters on the SUL, and if RSRP of a downlink pathloss reference is less than a threshold, it is considered that the criteria to select SUL is met.
  in a further implementation, if a carrier to use for a random access procedure is not explicitly signalled, and if a serving cell for the random access procedure configures the SUL, and if RSRP of a downlink pathloss reference is less than a threshold, it is considered that the criteria to select SUL is met.

In this embodiment, in a case where the criteria to select SUL being met includes "the serving cell of the random access procedure is configured with SUL", if one or more of the following conditions are met, it is considered that the SUL is configured in the serving cell, these conditions include but not limited to:

a ReconfigurationWithSync field includes a rach-ConfigDedicated field containing a supplementary Uplink;

an SCellConfig field includes a ServicingCellConfig field containing a supplementary Uplink;

a BWP-UplinkDedicated field includes a beamFailureRecoveryConfig field containing supplementary Uplink; and there exists a supplementary Uplink field.

In this implementation, unlike judging whether the serving cell is configured with SUL in performing the SI request described above, in the random access procedure, if the SUL configuration is received from the dedicated configuration, it is considered that the serving cell is configured with SUL.

In this embodiment, "the serving cell is configured with SUL" may also be expressed as any one of the following: considering that the serving cell is configured with SUL, SUL being configured, considering that SUL is configured, SUL being configured by the terminal equipment, considering that SUL is configured by the terminal equipment, considering by the terminal equipment that SUL is configured, and considering by the terminal equipment that the serving cell is configured with SUL, etc. Regardless of manners of expression, meanings thereof are identical. And in different scenarios, there may be different expressions, which are not limited in this embodiment.

In this embodiment, there is no restriction on the condition of "meeting the NUL criterion", and an existing condition of "meeting the NUL criterion" is applicable to this application.

FIG. 4 is a schematic diagram of an example of applying the method of this embodiment. As shown in FIG. 4, in a current standard, description of an on demand system information request may be modified. For example, "if SIB1 includes si-SchedulingInfo containing si-RequestConfigSUL" is replaced with "if the serving cell is configured with supplementary uplink", and "else if SIB1 includes si-SchedulingInfo containing si-RequestConfig" is replaced with "if the serving cell is configured with normal uplink".

FIG. 5 is a schematic diagram of another example of applying the method of this embodiment. As shown in FIG. 5, in the current standard, the description of triggering SI message acquisition may be modified, for example, an option "5> if the UE supports one or more of frequency bands indicated in the frequencyBandList of supplementary uplink band" is added, an option "6> consider supplementary uplink as configured in the serving cell" is added under this option, and the original option "6> trigger a request to acquire the SI message(s) as defined in sub-clause 5.2.2.3.3" is modified into "6> trigger a request to acquire the SI message(s) over supplementary uplink as defined in sub-clause 5.2.2.3.3".

In the example in FIG. 5, that "the terminal equipment supports one or more of frequency bands indicated in a frequencyBandList field for NUL" being taken as a condition that the serving cell is configured with SUL is taken as an example, and the above option 5> may also be replaced with other conditions that the serving cell is configured with the SUL, which shall not be described herein any further.

FIG. 6 is a schematic diagram of a further example of applying the method of this embodiment. As shown in FIG. 6, in the current standard, based on the modification of the relevant description in the current standard shown in FIG. 5, restrictions on NUL may also be added, such as adding option "5> else", and adding two options "6> consider normal uplink as configured in the serving cell" and "6> trigger a request to acquire the SI message(s) over normal uplink as defined in sub-clause 5.2.2.3.3" under this option.

In the example in FIG. 6, option "6> consider normal uplink as configured in the serving cell" may be replaced with "6> consider supplementary uplink as not configured in the serving cell".

The method of this embodiment determines to use the SI request procedure based on message 1 or the SI request procedure based on message 3 according to whether the serving cell is configured with the SUL, which may avoid selecting wrong SI request procedure in a case where the capability of the terminal equipment does not support.

In this embodiment, the condition of "the serving cell is configured with the SUL" may be integrated into a module, so that only the module needs to be called in making judgment, which optimizes terminal implementation procedure and saves cost.

FIG. 7 is another schematic diagram of the method for transmitting a system information request of this embodiment. As shown in FIG. 7, the method includes:

step 701: a terminal equipment determines to use the SI request procedure based on message 1 or the SI request procedure based on message 3 to request on demand system information from the network device via SUL or NUL (that is, on the SUL or on the NUL) according to whether SIB1 includes configuration of the SUL and whether the terminal equipment is able to support the configuration of the SUL.

In this embodiment, "whether a serving cell is configured with the SUL" refers to "whether SIB1 includes configuration of the SUL and whether the terminal equipment is able to support the configuration of the SUL", and the terminal equipment determines to use the SI request procedure based on message 1 or the SI request procedure based on message 3 according to whether SIB1 includes configuration of the SUL and whether the terminal equipment is able to support the configuration of the SUL, which may avoid selecting a wrong SI request procedure in a case where a capability of the terminal equipment does not support.

In this embodiment, if SIB1 includes si-SchedulingInfo containing si-Re questConfigSUL, and the terminal equipment is able to support the configuration of SUL, and the criteria to select SUL is met, the terminal equipment may use the SI request procedure based on message 1 on the SUL to request the network device for the on demand system information; otherwise, if SIB1 includes si-SchedulingInfo containing si-RequestConfig, and the terminal equipment is able to support the configuration of NUL, and the criteria to select NUL is met, the terminal equipment may use the SI request procedure based on message 1 on the NUL to request the network device for the on demand system information; otherwise, the terminal equipment uses the SI request procedure based on message 3 to request the network device for the on demand system information.

In this embodiment, it is considered that the terminal equipment is able to support the configuration of the SUL when one or more of the following conditions are met, these conditions include but not limited to that:

the terminal equipment supports one or more of frequency bands indicated in a frequencyBandList field for SUL;

the terminal equipment supports a bandwidth of an initial uplink BWP indicated in a locationAndBandwidth field for SUL; and the terminal equipment supports one or more additionalSpectrumEmissions in an NR-NS-PmaxList of a supported SUL band, or, the terminal equipment supports that an additionalSpectrumEmission in a supported SUL band is 0.

In this embodiment, it is considered that the terminal equipment is able to support the configuration of the NUL when one or more of the following conditions are met, these conditions include but not limited to that:

the terminal equipment supports one or more of frequency bands indicated in a frequencyBandList field for NUL;

the terminal equipment supports a bandwidth of an initial uplink BWP indicated in a locationAndBandwidth field for NUL; and the terminal equipment supports one or more additionalSpectrumEmissions in an NR-NS-PmaxList of a supported NUL band, or, the terminal equipment supports that an additionalSpectrumEmission in a supported NUL band is 0.

FIG. 8 is a schematic diagram of an example of applying the method of this embodiment. As shown in FIG. 8, in the current standard, description of the request for on demand system information may be modified. For example, "if SIB1 includes si-SchedulingInfo containing si-RequestConfigSUL and criteria to select supplementary uplink as defined in TS 38.321[13], clause 5.1.1 is met" is replaced with "if SIB1 includes si-SchedulingInfo containing si-RequestConfigSUL and if the UE supports one or more of the frequency bands indicated in the frequencyBandList of supplementary uplink and criteria to select supplementary uplink as defined in TS 38.321[13], clause 5.1.1 is met".

In the example of FIG. 8, that "the terminal equipment supports one or more of frequency bands indicated in a frequencyBandList field for SUL" being taken as a condition that "the terminal equipment supports the configuration of SUL" is taken as an example, and the above expression may also be replaced with other conditions that "the terminal equipment supports the configuration of SUL", which shall not be described herein any further.

Regarding the condition that "the terminal equipment supports the configuration of NUL", the current standard may also be supplemented or replaced accordingly, which shall not be described herein any further.

The method of this embodiment determines to use the SI request procedure based on message 1 or the SI request procedure based on message 3 according to whether SIB1 includes the configuration of SUL and the terminal equipment is able to support the configuration of SUL, which may avoid selecting wrong SI request procedure in a case where the capability of the terminal equipment does not support.

In addition, the method of this embodiment directly modifies the on demand system information request, which is flexible in implementation and may lower debugging overhead, thereby reducing costs.

FIG. 9 is a further schematic diagram of the method for transmitting a system information request of this embodiment. As shown in FIG. 9, the method includes:

step 901: a terminal equipment determines to use the SI request procedure based on message 1 or the SI request procedure based on message 3 according to whether the terminal equipment is able to support the configuration of SUL and the configuration of NUL to request on demand system information from the network device via SUL or NUL (i.e. on SUL or on NUL).

In this embodiment, "whether the serving cell is configured with SUL" refers to "whether the terminal equipment is able to support the configuration of SUL and the configuration of NUL", and the terminal equipment determines to use the SI request procedure based on message 1 or the SI request procedure based on message 3 according to whether the terminal equipment is able to support the configuration of SUL and the configuration of NUL, which may avoid selecting wrong SI request procedure in a case where the capability of the terminal equipment does not support.

In this embodiment, the SI request for acquiring the SI message on the SUL or the SI request for acquiring the SI message on the NUL may be triggered according to si-SchedulingInfo. If the SI request for acquiring the SI message on the SUL is triggered and the criteria to select SUL is met, the terminal equipment uses the SI request procedure based on message 1 on the SUL to request the network device for the on demand system information; otherwise, if the SI request for acquiring the SI message on the NUL is triggered and the criteria to select NUL is met, the terminal equipment uses the SI request procedure based on message 1 on the NUL to request the network device for the on demand system information; otherwise, the terminal equipment uses the SI request procedure based on message 3 to request the network device for the on demand system information.

In one implementation, according to si-SchedulingInfo, for the SI message "including at least one required SIB and its si-BroadcastStatus is set to be notBroadcasting", if si-SchedulingInfo of si-RequestConfigSUL containing the SI message is included and the terminal equipment is able to support the configuration of SUL, the SI request for acquiring the SI message on the SUL is triggered; otherwise, if si-SchedulingInfo of si-RequestConfig containing the SI message is included and the terminal equipment is able to support the configuration of NUL, the SI request for acquiring the SI message on the NUL is triggered.

The above triggering mode is an example only, and is not limited in this embodiment.

In this embodiment, the condition that "the terminal equipment is able to support the configuration of SUL" and the condition that "the terminal equipment is able to support the configuration of NUL" are identical to those in the implementation in FIG. 7, contents of which being incorporated herein, and being not going to be described herein any further.

FIG. 10 is a schematic diagram of an example of applying the method of this embodiment. As shown in FIG. 10, in the current standard, the description of triggering SI message acquisition may be modified, for example, an option "5> if the UE supports one or more of frequency bands indicated in the frequencyBandList of supplementary uplink band" is added, and the original option "6> trigger a request to acquire the SI message(s) as defined in sub-clause 5.2.2.3.3" is modified into "6> trigger a request to acquire the SI message(s) over supplementary uplink as defined in sub-clause 5.2.2.3.3".

In the example of FIG. 10, that "the terminal equipment supports one or more of frequency bands indicated in a frequencyBandList field for SUL" being taken as a condition that "the terminal equipment supports the configuration of SUL" is taken as an example, and the above option 5> may also be replaced with other conditions that "the terminal equipment supports the configuration of SUL", which shall not be described herein any further.

In the example in FIG. 10, similar to the example in FIG. 5, an option "6> consider supplementary uplink as configured in the serving cell" may be added under the added option 5>.

Regarding the condition that "the terminal equipment supports the configuration of NUL", the current standard may also be supplemented or replaced accordingly, which shall not be described herein any further.

The method of this embodiment first determines whether the terminal equipment is able to support the configuration of SUL and the configuration of NUL, and then determines to use the SI request procedure based on message 1 or the SI request procedure based on message 3, which may avoid selecting wrong SI request procedure in a case where the capability of the terminal equipment does not support.

In addition, the method of this embodiment divides the selection conditions into two levels, both integration and distribution are considered.

Embodiment 2

The embodiment of this disclosure provides a method for configuring a system information request, applicable to a network device. This method is processing at a network device side corresponding to the method of Embodiment 1, and contents in this embodiment identical to those in Embodiment 1 shall not be described herein any further. FIG. 11 is a schematic diagram of the method for configuring a system information request of this embodiment. As shown in FIG. 11, the method includes:

step 1101: a network device configures an SUL and/or an NUL for a terminal equipment;

step 1102: the network device receives an SI request based on message 1 or an SI request based on message 3 transmitted by the terminal equipment; and step 1103: the network device transmits on demand system information according to the SI request.

In this embodiment, the network device may transmit SIB1 to the terminal equipment, the SIB1 including si-SchedulingInfo containing si-RequestConfigSUL, or the SIB1 including si-SchedulingInfo containing si-RequestConfig. And the terminal equipment may accordingly determine whether the serving cell is configured with SUL and/or whether the terminal equipment supports the configuration of SUL and/or whether the terminal equipment supports the configuration of SUL and the configuration of NUL, and then determines whether to use the system information (SI) request procedure based on message 1 or the SI request procedure based on message 3 to request the network device for the on demand system information.

In this embodiment, the above on demand system information may be an SI message that "includes at least one required SIB and its si-BroadcastStatus is set to be not-Broadcasting", and this embodiment is not limited thereto.

With the method of this embodiment, selecting a wrong SI request procedure in a case where a capability of the terminal equipment does not support may be avoided.

Embodiment 3

The embodiment of this disclosure provides a carrier selection method, applicable to a terminal equipment. FIG. 12 is a schematic diagram of the carrier selection method of this embodiment. As shown in FIG. 12, the method includes:

step 1201: a terminal equipment selects an SUL carrier to perform a random access procedure when a serving cell is configured with an SUL and criteria to select SUL is met;

wherein, the criteria to select SUL being met is that, if a carrier to use for a random access procedure is not explicitly signalled, and if a serving cell for the random access procedure is configured with SUL or the SUL is configured via dedicated signaling, and if RSRP of a downlink pathloss reference is less than a threshold, the SUL carrier is selected for the random access procedure; or if a carrier to use for a random access procedure is not explicitly signalled, and if a serving cell for the random access procedure is configured with SUL or dedicated signaling includes configuration information of random access parameters on the SUL, and if RSRP of a downlink pathloss reference is less than a threshold, the SUL carrier is selected for the random access procedure; or if a carrier to use for a random access procedure is not explicitly signalled, and if a serving cell of the random access procedure is configured with SUL, and if RSRP of a downlink pathloss reference is less than a threshold, the SUL carrier is selected for the random access procedure.

In this embodiment, the above meeting the criteria to select the SUL has been described in Embodiment 1, the contents of which being incorporated here, and being not going to be described herein any further.

In this embodiment, for the SUL configuration provided in the above dedicated signaling, as long as the dedicated signaling provides the SUL configuration, it is considered that the SUL is configured.

For example, it may be indicated in the description of field or the description of procedures that the serving cell is configured with the SUL, the condition includes one or more of the following situations, that is, the terminal equipment may consider that the serving cell is configured with the SUL when one or more of the following conditions are met:

a ReconfigurationWithSync field includes a rach-ConfigDedicated field containing a supplementary Uplink;

an SCellConfig field includes a ServicingCellConfig field containing a supplementary Uplink;

a BWP-UplinkDedicated field includes a beamFailureRecoveryConfig field containing supplementary Uplink; and there exists a supplementary Uplink field.

With the method of this embodiment, the terminal equipment may obtain the configuration of SUL from the dedicated signaling, and perform random access according to the configuration of SUL provided in the dedicated signaling.

Embodiment 4

The embodiment of this disclosure provides an apparatus for transmitting a system information request, configured in a terminal equipment. As principles of the apparatus for solving problems are similar to that of the method of Embodiment 1, reference may be made to the implementation of the method of Embodiment 1 for implementation of this apparatus, with identical parts being not going to be described herein any further.

Figure 13:
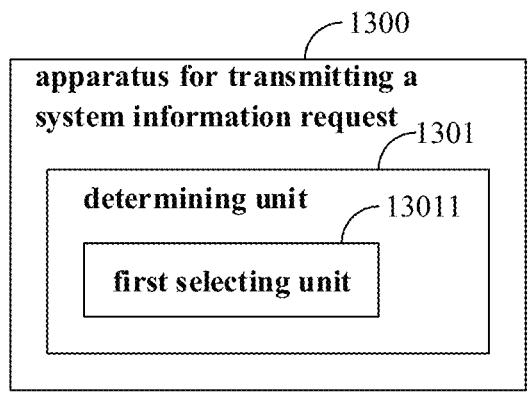
FIG. 13 is a schematic diagram of the apparatus for transmitting a system information request of Embodiment 4.

FIG. 13 is a schematic diagram of the apparatus for transmitting a system information request of this embodiment. As shown in FIG. 13, the apparatus 1300 includes:

a determining unit 1301 configured to determine to use a system information (SI) request procedure based on message 1 or an SI request procedure based on message 3 to request a network device for on demand system information via an SUL or an NUL according to whether a serving cell is configured with the SUL.

In one implementation, the determining unit 1301 includes a first selecting unit 13011 configured to, if the serving cell is configured with the SUL and criteria to select SUL is met, use the SI request procedure based on the message 1 on the SUL, otherwise, if the serving cell is configured with the NUL and criteria to select NUL is met, use the SI request procedure based on the message 1 on the NUL, otherwise, use the SI request procedure based on the message 3.

In this implementation, it is considered that the SUL is configured in the serving cell when one or more of the following conditions are met that:
  SIB1 includes si-SchedulingInfo containing si-Re questConfigSUL;
  the terminal equipment supports one or more of frequency bands indicated in a frequencyBandList field for SUL;
  the terminal equipment supports a bandwidth of an initial uplink BWP indicated in a locationAndBandwidth field for SUL; and the terminal equipment supports one or more additionalSpectrumEmissions in an NR-NS-PmaxList of a supported SUL band, or, the terminal equipment supports that an additionalSpectrumEmission in a supported SUL band is 0.

In this implementation, it is considered that the NUL is configured in the serving cell when one or more of the following conditions are met that:
  SIB1 includes si-SchedulingInfo containing si-RequestConfig;
  the terminal equipment supports one or more of frequency bands indicated in a frequencyBandList field for NUL;
  the terminal equipment supports a bandwidth of an initial uplink BWP indicated in a locationAndBandwidth field for NUL; and
  the terminal equipment supports one or more additionalSpectrumEmissions in an NR-NS-PmaxList of a supported NUL band, or, the terminal equipment supports that an additionalSpectrumEmission in a supported NUL band is 0.

In this implementation, the criteria to select SUL being met refers to:
  if a carrier to use for a random access procedure is not explicitly signalled, and if a serving cell for the random access procedure is configured with SUL or the SUL is configured via dedicated signaling, and if RSRP of a downlink pathloss reference is less than a threshold; or
  if a carrier to use for a random access procedure is not explicitly signalled, and if a serving cell for the random access procedure is configured with SUL or dedicated signaling includes configuration information of random access parameters on the SUL, and if RSRP of a downlink pathloss reference is less than a threshold; or
  if a carrier to use for a random access procedure is not explicitly signalled, and if a serving cell for the random access procedure is configured with SUL, and if RSRP of a downlink pathloss reference is less than a threshold.

In this implementation, in a case where the criteria to select SUL being met includes "the serving cell of the random access procedure is configured with SUL", if one or more of the following conditions are met, it is considered that the SUL is configured in the serving cell:
  a ReconfigurationWithSync field includes a rach-ConfigDedicated field containing a supplementary Uplink;
  an SCellConfig field includes a ServicingCellConfig field containing a supplementary Uplink;
  a BWP-UplinkDedicated field includes a beamFailureRecoveryConfig field containing supplementary Uplink; and
  there exists a supplementary Uplink field.

Figure 14:
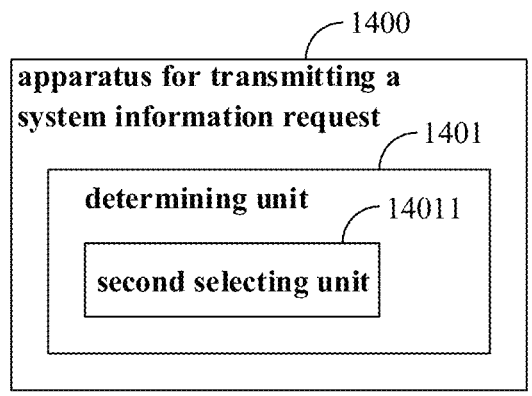
FIG. 14 is another schematic diagram of the apparatus for transmitting a system information request of Embodiment 4.

FIG. 14 is another schematic diagram of the apparatus for transmitting a system information request of this embodiment. As shown in FIG. 14, the apparatus 1400 includes:
  a determining unit 1401 configured to determine to use a system information (SI) request procedure based on message 1 or an SI request procedure based on message 3 to request the network device for on demand system information via an SUL or an NUL according to whether SIB1 includes configuration of the SUL and whether the terminal equipment supports the configuration of the SUL.

In one implementation, the determining unit 1401 includes a second selecting unit 14011 configured to, if SIB1 includes si-SchedulingInfo containing si-Re questConfigSUL, and the terminal equipment is able to support the configuration of the SUL, and the criteria to select SUL is met, use the SI request procedure based on the message 1 on the SUL, otherwise, if SIB1 includes si-SchedulingInfo containing si-RequestConfig, and the terminal equipment is able to support the configuration of the NUL, and the criteria to select NUL is met, use the SI request procedure based on the message 1 on the NUL, otherwise, use the SI request procedure based on the message 3.

In this implementation, it is considered that the terminal equipment is able to support the configuration of the SUL when one or more of the following conditions are met that:
  the terminal equipment supports one or more of frequency bands indicated in a frequencyBandList field for SUL;
  the terminal equipment supports a bandwidth of an initial uplink BWP indicated in a locationAndBandwidth field for SUL; and
  the terminal equipment supports one or more additionalSpectrumEmissions in an NR-NS-PmaxList of a supported SUL band, or, the terminal equipment supports that an additionalSpectrumEmission in a supported SUL band is 0.

In this implementation, it is considered that the terminal equipment is able to support the configuration of the NUL when one or more of the following conditions are met that:
  the terminal equipment supports one or more of frequency bands indicated in a frequencyBandList field for NUL;
  the terminal equipment supports a bandwidth of an initial uplink BWP indicated in a locationAndBandwidth field for NUL; and
  the terminal equipment supports one or more additionalSpectrumEmissions in an NR-NS-PmaxList of a supported NUL band, or, the terminal equipment supports that an additionalSpectrumEmission in a supported NUL band is 0.

Figure 15:
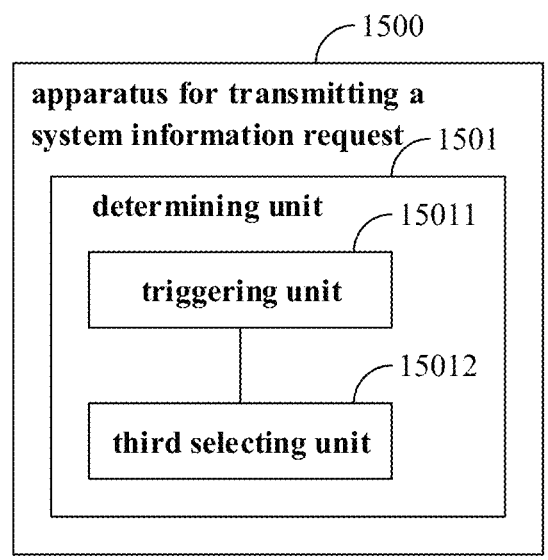
FIG. 15 is a further schematic diagram of the apparatus for transmitting a system information request of Embodiment 4.

FIG. 15 is a further schematic diagram of the apparatus for transmitting a system information request of this embodiment. As shown in FIG. 15, the apparatus 1500 includes:
  a determining unit 1501 configured to determine to use a system information (SI) request procedure based on message 1 or an SI request procedure based on message 3 to request a network device for on demand system information via an SUL or an NUL according to whether the terminal equipment is able to support configuration of the SUL and configuration of the NUL.

In this implementation, the determining unit 1501 includes a triggering unit 15011 and a third selecting unit 15012. The triggering unit 15011 is configured to trigger an SI request for acquiring an SI message on the SUL or an SI request for acquiring an SI message on the NUL according to the si-SchedulingInfo, and the third selecting unit 15012 is configured to, if the SI request for acquiring an SI message on the SUL is triggered and the criteria to select SUL is met, use the SI request procedure based on the message 1 on the SUL, otherwise, if the SI request for acquiring an SI message on the NUL is triggered and the criteria to select NUL is met, use the SI request procedure based on the message 1 on the NUL, otherwise, use the SI request procedure based on the message 3.

In this implementation, according to the si-SchedulingInfo, for an SI message including at least one required SIB and an si-BroadcastStatus thereof being set to be notBroadcasting, if the si-SchedulingInfo containing the si-RequestConfigSUL corresponding to the SI message is included and the terminal equipment is able to support the configuration of the SUL, the triggering unit 15011 triggers the SI request for acquiring the SI message on the SUL, otherwise, if the si-SchedulingInfo containing the si-RequestConfig corresponding to the SI message is included and the terminal equipment is able to support the configuration of the NUL, the triggering unit 15011 triggers the SI request for acquiring the SI message on the NUL.

In this implementation, it is considered that the terminal equipment is able to support the configuration of the SUL when one or more of the following conditions are met that:
the terminal equipment supports one or more of frequency bands indicated in a frequencyBandList field for SUL;
the terminal equipment supports a bandwidth of an initial uplink BWP indicated in a locationAndBandwidth field for SUL; and
the terminal equipment supports one or more additionalSpectrumEmissions in an NR-NS-PmaxList of a supported SUL band, or, the terminal equipment supports that an additionalSpectrumEmission in a supported SUL band is 0.

In this implementation, it is considered that the terminal equipment is able to support the configuration of the NUL when one or more of the following conditions are met that:
the terminal equipment supports one or more of frequency bands indicated in a frequencyBandList field for NUL;
the terminal equipment supports a bandwidth of an initial uplink BWP indicated in a locationAndBandwidth field for NUL; and
the terminal equipment supports one or more additionalSpectrumEmissions in an NR-NS-PmaxList of a supported NUL band, or, the terminal equipment supports that an additionalSpectrumEmission in a supported NUL band is 0.

With the apparatus of this embodiment, selecting a wrong SI request procedure in a case where a capability of the terminal equipment does not support may be avoided.

Embodiment 5

The embodiment of this disclosure provides an apparatus for configuring a system information request, configured in a network device. As principles of the apparatus for solving problems are similar to that of the method of Embodiment 2, reference may be made to the implementation of the method of Embodiment 2 for implementation of this apparatus, with identical parts being not going to be described herein any further.

Figure 16:
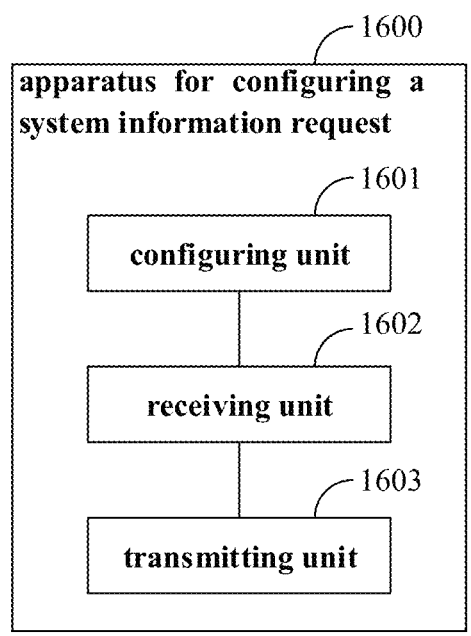
FIG. 16 is a schematic diagram of the apparatus for configuring a system information request of Embodiment 5.

FIG. 16 is a schematic diagram of the apparatus for configuring a system information request of this embodiment. As shown in FIG. 16, the apparatus 1600 includes a configuring unit 1601, a receiving unit 1602 and a transmitting unit 1603. The configuring unit 1601 is configured to configure an SUL and/or an NUL for a terminal equipment, the receiving unit 1602 is configured to receive an SI request based on message 1 or an SI request based on message 3 transmitted by the terminal equipment, and the transmitting unit 1603 is configured to transmit on demand system information according to the SI request.

In this embodiment, the configuring unit 1601 may transmit an SIB1 to the terminal equipment, SIB1 including an si-SchedulingInfo containing an si-RequestConfigSUL, or including an si-SchedulingInfo containing si-RequestConfig. And the terminal equipment may accordingly determine to use the system information (SI) based on message 1 or the SI request procedure based on message 3 to request the network device via the SUL or NUL (i.e. on the SUL or on the NUL) for the on demand system information. Processing of the terminal equipment has been described in Embodiment 1, and shall not be described herein any further.

In this embodiment, the above on demand system information may be an SI message that "includes at least one required SIB and its si-BroadcastStatus is set to be notBroadcasting", and this embodiment is not limited thereto.

With the apparatus of this embodiment, selecting a wrong SI request procedure in a case where a capability of the terminal equipment does not support may be avoided.

Embodiment 6

The embodiment of this disclosure provides a carrier selection apparatus, configured in a terminal equipment. As principles of the apparatus for solving problems are similar to that of the method of Embodiment 3, reference may be made to the implementation of the method of Embodiment 3 for implementation of this apparatus, with identical parts being not going to be described herein any further.

Figure 17:
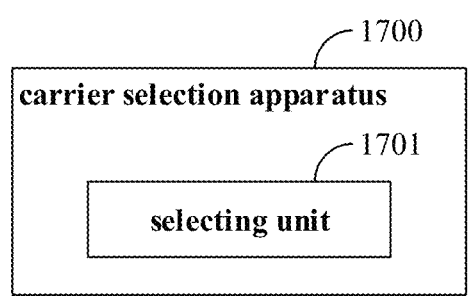
FIG. 17 is a schematic diagram of the carrier selection apparatus of Embodiment 6.

FIG. 17 is a schematic diagram of the carrier selection apparatus 1700 of this embodiment. As shown in FIG. 17, the apparatus 1700 includes:
a selecting unit 1701 configured to select an SUL carrier to perform a random access procedure when a serving cell is configured with an SUL and criteria to select SUL is met; wherein, the criteria to select SUL being met is that,
if a carrier to use for a random access procedure is not explicitly signalled, and if a serving cell for the random access procedure is configured with SUL or the SUL is configured via dedicated signaling, and if RSRP of a downlink pathloss reference is less than a threshold, the SUL carrier is selected for the random access procedure; or
if a carrier to use for a random access procedure is not explicitly signalled, and if a serving cell for the random access procedure is configured with SUL or dedicated signaling includes configuration information of random access parameters on the SUL, and if RSRP of a downlink pathloss reference is less than a threshold, the SUL carrier is selected for the random access procedure; or
if a carrier to use for a random access procedure is not explicitly notified, and if a serving cell for the random access procedure is configured with SUL, and if RSRP of a downlink pathloss reference is less than a threshold, the SUL carrier is selected for the random access procedure.

In this embodiment, it is considered that the SUL is configured in the serving cell when one or more of the following conditions are met that:

- a ReconfigurationWithSync field includes a rach-ConfigDedicated field containing a supplementary Uplink;
- an SCellConfig field includes a ServicingCellConfig field containing a supplementary Uplink;
- a BWP-UplinkDedicated field includes a beamFailureRecoveryConfig field containing supplementary Uplink; and
- there exists a supplementary Uplink field.

With the apparatus of this embodiment, the terminal equipment may obtain the configuration of SUL from the dedicated signaling, and perform random access according to the configuration of SUL provided in the dedicated signaling.

Embodiment 7

The embodiment of this disclosure provides a terminal equipment, including the apparatus described in Embodiment 4 or 6.

Figure 18:
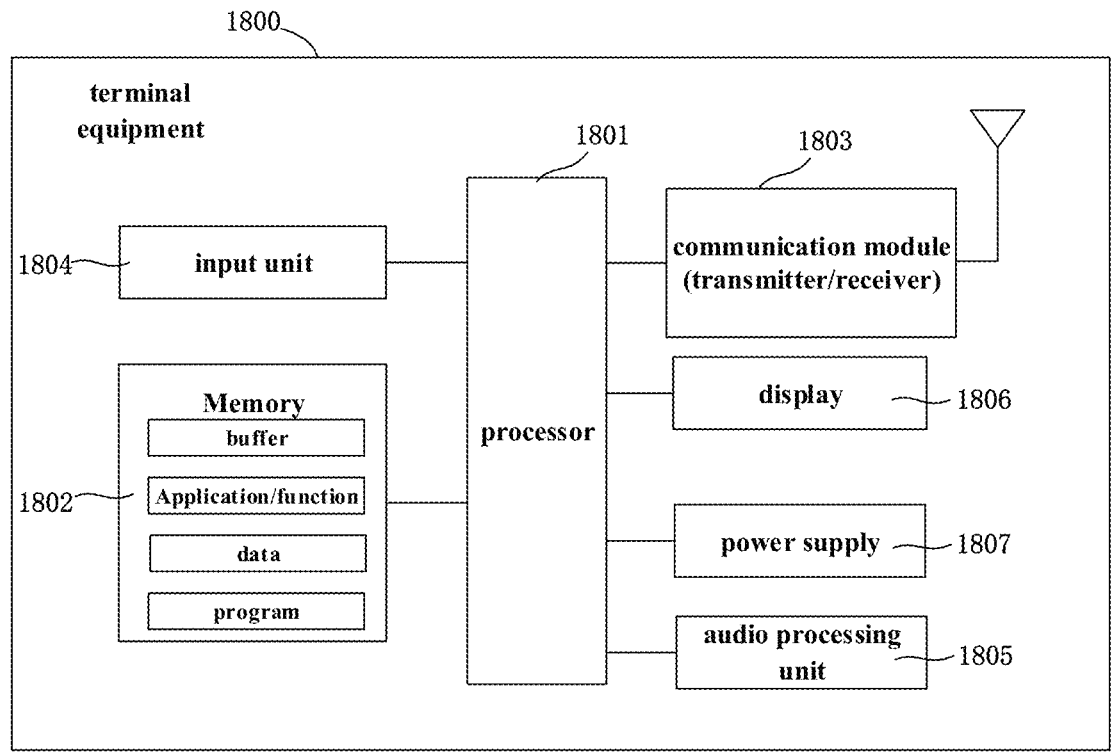
FIG. 18 is a schematic diagram of the terminal equipment of Embodiment 7.

FIG. 18 is a schematic diagram of the terminal equipment of the embodiment of this disclosure. As shown in FIG. 18, the terminal equipment 1800 may include a central processing unit 1801 and a memory 1802, the memory 1802 being coupled to the central processing unit 1801. It should be noted that this figure is illustrative only, and other types of structures may also be used, so as to supplement or replace this structure and achieve a telecommunications function or other functions.

In one implementation, the functions of the apparatus described in Embodiment 4 or 6 may be integrated into the central processing unit 1801, and the central processing unit 1801 executes functions of the apparatus described in Embodiment 4 or 6. The functions of the apparatus described in Embodiment 4 or 6 are incorporated herein, and shall not be described herein any further.

In another implementation, the apparatus described in Embodiment 4 or 6 and the central processing unit 1801 may be configured separately; for example, the apparatus described in Embodiment 4 or 6 may be configured as a chip connected to the central processing unit 1801, and the functions of the apparatus described in Embodiment 4 or 6 are executed under control of the central processing unit 1801.

As shown in FIG. 18, the terminal equipment 1800 may further include a communication module 1803, an input unit 1804, an audio processing unit 1805, a display 1806, and a power supply 1807, etc. It should be noted that the terminal equipment 1800 does not necessarily include all the parts shown in FIG. 18. Furthermore, the terminal equipment 1800 may include parts not shown in FIG. 18, and the related art may be referred to.

As shown in FIG. 18, the central processing unit 1801 is sometimes referred to as a controller or an operational control, which may include a microprocessor or other processor devices and/or logic devices. The central processing unit 1801 receives input and controls operations of components of the terminal equipment 1800.

The memory 1802 may be, for example, one or more of a buffer memory, a flash memory, a hard drive, a mobile medium, a volatile memory, a nonvolatile memory, or other suitable devices, which may store information related to the configuration above, and furthermore, store programs executing related information. And the central processing unit 1801 may execute programs stored in the memory 1802, so as to realize information storage or processing, etc. Functions of other parts are similar to those of the related art, which shall not be described herein any further. The parts of the terminal equipment 1800 may be realized by specific hardware, firmware, software, or any combination thereof, without departing from the scope of this disclosure.

With the terminal equipment of this embodiment, selecting a wrong SI request procedure in a case where a capability of the terminal equipment does not support may be avoided, or the configuration of SUL may be obtained from the dedicated signaling, and random access may be performed according to the configuration of SUL provided in the dedicated signaling.

Embodiment 8

The embodiment of this disclosure provides a network device, including the apparatus described in Embodiment 5.

Figure 19:
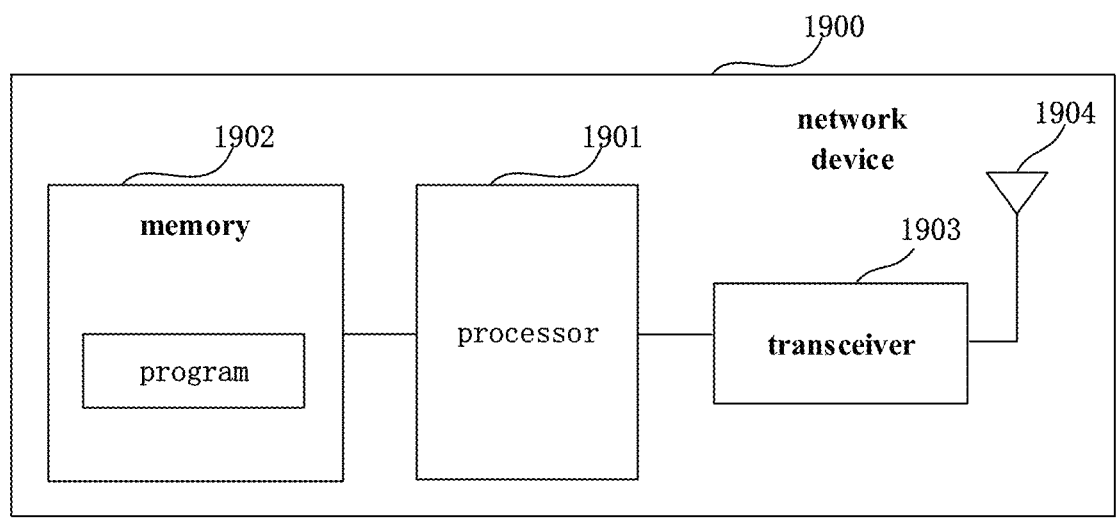
FIG. 19 is a schematic diagram of the network device of Embodiment 8.

FIG. 19 is a schematic diagram of a structure of the network device of the embodiment of this disclosure. As shown in FIG. 19, the network device 1900 may include a central processing unit (CPU) 1901 and a memory 1902, the memory 1902 being coupled to the central processing unit 1901. The memory 1902 may store various data, and furthermore, it may store a program for data processing, and execute the program under control of the central processing unit 1901, so as to receive various information transmitted by a terminal equipment, and transmit various information to the terminal equipment.

In one implementation, the functions of the apparatus described in Embodiment 5 may be integrated into the central processing unit 1901, and the central processing unit 1901 executes functions of the apparatus described in Embodiment 5. The functions of the apparatus described in Embodiment 5 are incorporated herein, and shall not be described herein any further.

In another implementation, the apparatus described in Embodiment 5 and the central processing unit 1901 may be configured separately; for example, the apparatus described in Embodiment 5 may be configured as a chip connected to the central processing unit 1901, and the functions of the apparatus described in Embodiment 5 are executed under control of the central processing unit 1901.

Furthermore, as shown in FIG. 19, the network device 1900 may include a transceiver 1903, and an antenna 1904, etc. Functions of the above components are similar to those in the related art, and shall not be described herein any further. It should be noted that the network device 1900 does not necessarily include all the parts shown in FIG. 19. Furthermore, the network device 1900 may include parts not shown in FIG. 19, and the related art may be referred to.

With the network device of this embodiment, selecting a wrong SI request procedure in a case where a capability of the terminal equipment does not support may be avoided.

Embodiment 9

The embodiment of this disclosure provides a communication system, including a network device and a terminal equipment. The network device is, for example, the network device 1900 described in Embodiment 8, and the terminal equipment is, for example, the terminal equipment 1800 described in Embodiment 7.

In this embodiment, the terminal equipment is, for example, a UE served by a gNB, and may include the functions of the apparatus described in Embodiment 4 or 6 in addition to conventional compositions and functions of a terminal equipment, which are as described in Embodiment 7, and shall not be described herein any further.

In this embodiment, the network device may be, for example, a gNB in NR, and may include the functions of the apparatus described in Embodiment 5 in addition to conventional compositions and functions of a network device, which are as described in Embodiment 8, and shall not be described herein any further.

With the communication system of this embodiment, selecting a wrong SI request procedure in a case where a capability of the terminal equipment does not support may be avoided.

An embodiment of this disclosure provides a computer readable program, which, when executed in a terminal equipment, will cause a computer to carry out the method described in Embodiment 1 or 3 in the terminal equipment.

An embodiment of this disclosure provides a storage medium storing a computer readable program, which will cause a computer to carry out the method described in Embodiment 1 or 3 in a terminal equipment.

An embodiment of this disclosure provides a computer readable program, which, when executed in a network device, will cause a computer to carry out the method described in Embodiment 2 in the network device.

An embodiment of this disclosure provides a storage medium storing a computer readable program, which will cause a computer to carry out the method described in Embodiment 2 in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

What is claimed is:

1. An apparatus for transmitting a system information request, configured in a terminal equipment, the apparatus including:
   a memory; and
   processor circuitry configured to determine to use a system information (SI) request procedure based on message 1 or an SI request procedure based on message 3 to request a network device for on demand system information on an supplementary uplink (SUL) or an normal uplink (NUL) according to whether a serving cell is configured with SUL;
   wherein the processor circuitry is further configured to:
   if system information block 1 (SIB1) comprises si-SchedulingInfo containing si-RequestConfigSUL, the terminal equipment supports one or more of frequency bands indicated in a frequencyBandList field for SUL, and supports at least one additionalSpectrumEmission in an NR-NS-PmaxList of a supported SUL band, and criteria to select SUL is met, use the SI request procedure based on message 1 on the SUL;
   otherwise, if the serving cell is configured with a NUL and criteria to select NUL is met, use the SI request procedure based on message 1 on the NUL;
   otherwise, use the SI request procedure based on message 3;
   wherein it is considered the NUL is configured in the serving cell when one or more of the following conditions are met that:
   the SIB1 includes si-SchedulingInfo containing si-RequestConfig;
   the terminal equipment supports one or more of frequency bands indicated in a frequencyBandList field for NUL;
   the terminal equipment supports a bandwidth of an initial uplink bandwith part (BWP) indicated in a locationAndBandwidth field for NUL; and
   the terminal equipment supports at least one additionalSpectrumEmission in an NR-NS-PmaxList of a supported NUL band, or, the terminal equipment supports that an additionalSpectrumEmission in a supported NUL band is 0.

2. The apparatus according to claim 1, wherein the criteria to select SUL being met refers to:

if a carrier to use for a random access procedure is not explicitly signalled, and if a serving cell for the random access procedure is configured with SUL or the SUL is configured via dedicated signaling, and if reference signal receiving power (RSRP) of a downlink pathloss reference is less than a threshold; or if a carrier to use for a random access procedure is not explicitly signalled, and if a serving cell for the random access procedure is configured with SUL or dedicated signaling includes configuration information of random access parameters on the SUL, and if RSRP of a downlink pathloss reference is less than a threshold; or if a carrier to use for a random access procedure is not explicitly signalled, and if a serving cell for the random access procedure is configured with SUL, and if RSRP of a downlink pathloss reference is less than a threshold.

3. The apparatus according to claim 2, wherein if the criteria to select SUL being met includes that the serving cell for the random access procedure is configured with SUL, it is considered the SUL is configured in the serving cell when one or more of the following conditions are met that:

a ReconfigurationWithSync field includes a rach-ConfigDedicated field containing a supplementaryUplink;

an SCellConfig field includes a ServicingCellConfig field containing a supplementaryUplink;

a BWP-UplinkDedicated field includes a beamFailureRecoveryConfig field containing supplementaryUplink; and there exists a supplementaryUplink field.

4. The apparatus according to claim 1, wherein whether a serving cell is configured with SUL refers to whether the SIB1 includes configuration of SUL and whether the terminal equipment is able to support the configuration of the SUL.

5. The apparatus according to claim 4, wherein the processor circuitry includes:

a second selecting unit configured to, if the SIB1 includes si-SchedulingInfo containing a si-RequestConfigSUL, the terminal equipment is able to support the configuration of the SUL and the criteria to select SUL is met, use the SI request procedure based on message 1 on the SUL;

otherwise, if the SIB1 includes si-SchedulingInfo containing a si-RequestConfig, and the terminal equipment is able to support configuration of the NUL, and the criteria to select NUL is met, use the SI request procedure based on message 1 on the NUL;

otherwise, use the SI request procedure based on message 3.

6. The apparatus according to claim 5, wherein it is considered that the terminal equipment is able to support the configuration of the SUL when one or more of the following conditions are met that:

the terminal equipment supports one or more of frequency bands indicated in a frequencyBandList field for the SUL;

the terminal equipment supports a bandwidth of an initial uplink BWP indicated in a locationAndBandwidth field for the SUL; and the terminal equipment supports at least one additionalSpectrumEmissions in an NR-NS-PmaxList of a supported SUL band, or, the terminal equipment supports that an additionalSpectrumEmission in a supported SUL band is 0.

7. The apparatus according to claim 5, wherein it is considered that the terminal equipment is able to support the configuration of the NUL when one or more of the following conditions are met that:

the terminal equipment supports one or more of frequency bands indicated in a frequencyBandList field for the NUL;

the terminal equipment supports a bandwidth of an initial uplink BWP indicated in a locationAndBandwidth field for the NUL; and the terminal equipment supports at least one additionalSpectrumEmissions in an NR-NS-PmaxList of a supported NUL band, or, the terminal equipment supports that an additionalSpectrumEmission in a supported NUL band is 0.

8. The apparatus according to claim 1, wherein whether a serving cell is configured with SUL refers to whether the terminal equipment is able to support the configuration of SUL and the configuration of NUL.

9. The apparatus according to claim 8, wherein the processor circuitry includes:

a triggering unit configured to trigger an SI request for acquiring an SI message on the SUL or an SI request for acquiring an SI message on the NUL according to the si-SchedulingInfo; and a third selecting unit configured to, if the SI request for acquiring an SI message on the SUL is triggered and the criteria to select SUL is met, use the SI request procedure based on message 1 on the SUL;

otherwise, if the SI request for acquiring an SI message on the NUL is triggered and the criteria to select NUL is met, use the SI request procedure based on message 1 on the NUL;

otherwise, use the SI request procedure based on message 3.

10. The apparatus according to claim 9, wherein, according to the si-SchedulingInfo, for an SI message including at least one required system information block (SIB) and an si-BroadcastStatus thereof being set to be notBroadcasting:

if the si-SchedulingInfo containing the si-RequestConfigSUL corresponding to the SI message is included and the terminal equipment is able to support the configuration of the SUL, the triggering unit triggers the SI request for acquiring the SI message on the SUL;

otherwise, if the si-SchedulingInfo containing the si-RequestConfig corresponding to the SI message is included and the terminal equipment is able to support the configuration of the NUL, the triggering unit triggers the SI request for acquiring the SI message on the NUL.

11. The apparatus according to claim 10, wherein it is considered that the terminal equipment is able to support the configuration of the SUL when one or more of the following conditions are met that:

the terminal equipment supports one or more of frequency bands indicated in a frequencyBandList field for the SUL;

the terminal equipment supports a bandwidth of an initial uplink BWP indicated in a locationAndBandwidth field for the SUL; and the terminal equipment supports at least one additionalSpectrumEmissions in an NR-NS-PmaxList of a supported SUL band, or, the terminal equipment supports that an additionalSpectrumEmission in a supported SUL band is 0.

12. The apparatus according to claim 10, wherein it is considered that the terminal equipment is able to support the configuration of the NUL when one or more of the following conditions are met that:

the terminal equipment supports one or more of frequency bands indicated in a frequencyBandList field for the NUL;

the terminal equipment supports a bandwidth of an initial uplink BWP indicated in a locationAndBandwidth field for the NUL; and the terminal equipment supports at least one additionalSpectrumEmissions in an NR-NS-PmaxList of a supported NUL band, or, the terminal equipment supports that an additionalSpectrumEmission in a supported NUL band is 0.

13. A carrier selection apparatus, configured in a terminal equipment, the apparatus including:

a selecting unit configured to select an supplementary uplink (SUL) carrier for performing a random access procedure when a serving cell is configured with an SUL and criteria to select SUL is met; wherein, the criteria to select SUL being met is that, if a carrier to use for a random access procedure is not explicitly signalled, and the SUL is configured via dedicated signaling, and if reference signal receiving power (RSRP) of a downlink pathloss reference is less than a threshold, the SUL carrier is selected for the random access procedure; or if a carrier to use for a random access procedure is not explicitly signalled, and dedicated signaling includes configuration information of random access parameters on the SUL, and if RSRP of a downlink pathloss reference is less than a threshold, the SUL carrier is selected for the random access procedure.

14. The apparatus according to claim 13, wherein it is considered that the SUL is configured in the serving cell when one or more of the following conditions are met that:

a ReconfigurationWithSync field includes a rach-ConfigDedicated field containing a supplementaryUplink;

an SCellConfig field includes a ServicingCellConfig field containing a supplementaryUplink;

a bandwith part (BWP)-UplinkDedicated field includes a beamFailureRecoveryConfig field containing supplementaryUplink; and there exists a supplementaryUplink field.

15. The apparatus according to claim 1, wherein the processor circuitry is further configured to:

use the SI request procedure based on message 1 on the SUL when a first condition is met, use the SI request procedure based on message 1 on the NUL when the first condition is not met and a second condition is met, and use the SI request procedure based on message 3 when the first condition and the second condition are met, the first condition includes conditions which the SIB 1 comprises the si-SchedulingInfo containing the si-RequestConfigSUL, the terminal equipment supports the one or more of frequency bands indicated in the frequencyBandList field for the SUL, and supports at least one additionalSpectrumEmission in the NR-NS-PmaxList of the supported SUL band, and the criteria to select the SUL is met, the second condition includes conditions which the serving cell is configured with the NUL and the criteria to select NUL is met.

16. The apparatus according to claim 1, wherein it is considered the NUL is configured in the serving cell when the following conditions are met that:

the SIB1 includes si-SchedulingInfo containing si-RequestConfig;

the terminal equipment supports the one or more of frequency bands indicated in the frequencyBandList field for NUL;

the terminal equipment supports the bandwidth of the initial uplink bandwith part (BWP) indicated in the locationAndBandwidth field; and the terminal equipment supports at least one additionalSpectrumEmission in the NR-NS-PmaxList of a supported NUL band, or the terminal equipment supports that the additionalSpectrumEmission in a supported NUL band is 0.

* * * * *